(12) United States Patent
Takada (10) Patent No.: US 10,641,884 B2
(45) Date of Patent: May 5, 2020

(54) RADAR TRANSCEIVER

(71) Applicant: Yuji Takada, Tokyo (JP)

(72) Inventor: Yuji Takada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 280 days.

(21) Appl. No.: 15/879,775

(22) Filed: Jan. 25, 2018

(65) Prior Publication Data

US 2018/0210076 A1  Jul. 26, 2018

(30) Foreign Application Priority Data

Jan. 26, 2017 (JP) .................................. 2017-012392
Dec. 22, 2017 (JP) .................................. 2017-246207

(51) Int. Cl.

| G01S 13/58 | (2006.01) |
|---|---|
| G01S 13/04 | (2006.01) |
| G01S 13/56 | (2006.01) |
| G01S 17/93 | (2020.01) |
| G01S 7/35 | (2006.01) |
| G01S 17/00 | (2020.01) |
| G01S 7/491 | (2020.01) |
| G01S 13/34 | (2006.01) |
| G01S 17/32 | (2020.01) |
| G01S 13/00 | (2006.01) |
| G01S 13/93 | (2020.01) |
| G01S 7/4911 | (2020.01) |

(Continued)

(52) U.S. Cl.
CPC .............. *G01S 13/584* (2013.01); *G01S 7/35* (2013.01); *G01S 7/354* (2013.01); *G01S 7/4911* (2013.01); *G01S 7/4913* (2013.01); *G01S 13/003* (2013.01); *G01S 13/04* (2013.01); *G01S 13/343* (2013.01); *G01S 13/345* (2013.01); *G01S 13/56* (2013.01); *G01S 13/931* (2013.01); *G01S 17/003* (2013.01); *G01S 17/325* (2013.01); *G01S 17/936* (2013.01); *G01S 2007/358* (2013.01); *G01S 2013/9367* (2013.01)

(58) Field of Classification Search
CPC .......... G01S 7/35; G01S 7/354; G01S 13/343; G01S 13/345; G01S 13/931
See application file for complete search history.

(56) References Cited

U.S. PATENT DOCUMENTS

| 2005/0156780 A1* | 7/2005 | Bonthron .................. G01S 3/48 342/107 |
| 2005/0225481 A1* | 10/2005 | Bonthron ................ G01S 7/032 342/175 |

(Continued)

FOREIGN PATENT DOCUMENTS

| JP | 2000-206234 A | 7/2000 |
| JP | 2010-112879 A | 5/2010 |
| JP | 2015172510 A | * 10/2015 |

*Primary Examiner* — Peter M Bythrow
(74) *Attorney, Agent, or Firm* — Brundidge & Stanger, P.C.

(57) ABSTRACT

A radar transceiver (100) includes: a transmission-signal forming section (110) that forms an upbeat signal and a downbeat signal from a carrier signal and a chirp signal, using an image rejection circuit; and a received-signal processing section (120) that separates a reflection signal received via a reception antenna (105) into a reflection signal based on the upbeat signal and a reflection signal based on the downbeat signal, using an image rejection circuit.

5 Claims, 5 Drawing Sheets

(51) Int. Cl.
*G01S 13/931* (2020.01)
*G01S 7/4913* (2020.01)

(56) References Cited

U.S. PATENT DOCUMENTS

2009/0309782 A1* 12/2009 Takabayashi ......... G01S 13/343
                                                342/105
2011/0122013 A1*  5/2011 Takeya .................... G01S 13/44
                                                342/109

* cited by examiner

RADAR TRANSCEIVER

CROSS REFERENCE TO RELATED APPLICATIONS

This application is entitled and claims the benefit of Japanese Patent Application No. 2017-012392, filed on Jan. 26, 2017, and Japanese Patent Application No. 2017-246207, filed on Dec. 22, 2017, the disclosures of which including the specifications, drawings and abstracts are incorporated herein by reference in their entirety.

TECHNICAL FIELD

The present invention relates to a radar transceiver to be mounted on, for example, a vehicle and capable of detecting a surrounding object.

BACKGROUND ART

Radars using millimeter waves having a wavelength of 1 to 10 mm (frequency: 30 to 300 GHz) (so-called millimeter-wave radars) have been known as one of radar transceivers to be mounted on vehicles and capable of detecting surrounding objects. Since the millimeter-wave radars use a radio wave, the millimeter-wave radars have an advantage of ensuring a certain sensitivity even under bad weather conditions, such as rain and fog. The millimeter-wave radar can obtain information about its surrounding environment (such as a position (distance, direction and/or the like) and a relative velocity of a detection target object (hereinafter, referred to as "target object")) by transmitting a transmission signal (radio wave) around an automobile, receiving a reflection signal (reflected wave) reflected from the target object, and analyzing the reflection signal.

Furthermore, in recent years, high-resolution millimeter-wave radars using a 79 GHz band (77 to 81 GHz) millimeter wave have been put to practical use in order to detect an artificial object, such as an automobile, and a pedestrian (human) while separating the artificial object and pedestrian from each other.

As a millimeter-wave radar of this type, a frequency modulated-continuous wave (FM-CW) system has been widely used. In the FM-CW system, a frequency modulated continuous wave is transmitted as a radar signal, and a reflection signal from a target object is received. A relative velocity and relative distance of the target object are then detected based on a frequency difference between the transmitted and received signals. The FM-CW system is described in Patent Literature (hereinafter referred to as "PTL") 1 and PTL 2, for example.

CITATION LIST

Patent Literature

PTL 1
Japanese Patent Application Laid-Open No. 2010-112879
PTL 2
Japanese Patent Application Laid-Open No. 2000-206234

SUMMARY OF INVENTION

Technical Problem

The radar transceiver described in PTL 1, however, has a disadvantage of a long measurement time because the radar transceiver is configured to transmit an upbeat signal and a downbeat signal in a time division manner.

Meanwhile, the radar transceiver described in PTL 2 is considered to have a short measurement time as compared with the case where two signals are transmitted and received in a time division manner as mentioned in PTL 1 because the radar transceiver described in PTL 2 is configured to form an upper mixed-signal and a lower mixed-signal by separation processing using a bandpass filter from a signal resulting from mixing a chirp signal and a carrier signal, and thereby to simultaneously transmit the upper mixed-signal and the lower mixed-signal.

With the configuration using a bandpass filter as in PTL 2, formation of the upper mixed-signal and the lower mixed-signal in a millimeter-wave band of a 79 GHz band (77 to 81 GHz) is considered to be difficult although formation of signals distant from each other in frequency band is considered to be easy. In practice, signals of distant frequency bands where the upper-side frequency is around 76.5 GHz and the lower-side frequency is around 60.5 GHz.

Furthermore, it is also possible to consider a case where the upbeat signal and the downbeat signal are formed using different systems of a transmission circuit but transmitted simultaneously. This case, however, requires two systems of a transmission circuit and thus complicates the configuration.

The present invention has been made taking the points mentioned above into consideration and thus provides a radar transceiver capable of forming, using a simple configuration, an upbeat signal and a downbeat signal to be simultaneously transmitted.

Solution to Problem

A radar transceiver according to one aspect of the present invention is a radar transceiver that transmits an upbeat signal and a downbeat signal, simultaneously, and receives the upbeat signal and the downbeat signal to detect a target object, the radar transceiver including: a transmission-signal forming section that forms the upbeat signal and the downbeat signal from a carrier signal and a chirp signal, using an image rejection circuit; a transmission section that simultaneously transmits the upbeat signal and the downbeat signal formed by the transmission-signal forming section; a reception section that receives a reflection signal generated when the transmitted upbeat and downbeat signals are reflected from the target object; and a received-signal processing section that separates, using an image rejection circuit, the reflection signal received by the reception section into a reflection signal based on the upbeat signal and a reflection signal based on the downbeat signal.

Advantageous Effects of Invention

According to the present invention, it is made possible to form, using a simple configuration, an upbeat signal and a downbeat signal to be simultaneously transmitted.

BRIEF DESCRIPTION OF DRAWINGS

FIG. 1 is a schematic diagram illustrating an overall configuration of a radar transceiver according to an embodiment;

FIG. 2 is a diagram illustrating a chirp signal;

FIG. 3 is a schematic diagram illustrating how frequencies of first transmission signal TX1 and second transmission signal TX2 change;

DESCRIPTION OF EMBODIMENTS

Hereinafter, an embodiment of the present invention will be described with reference to the accompanying drawings.

Figure 1:
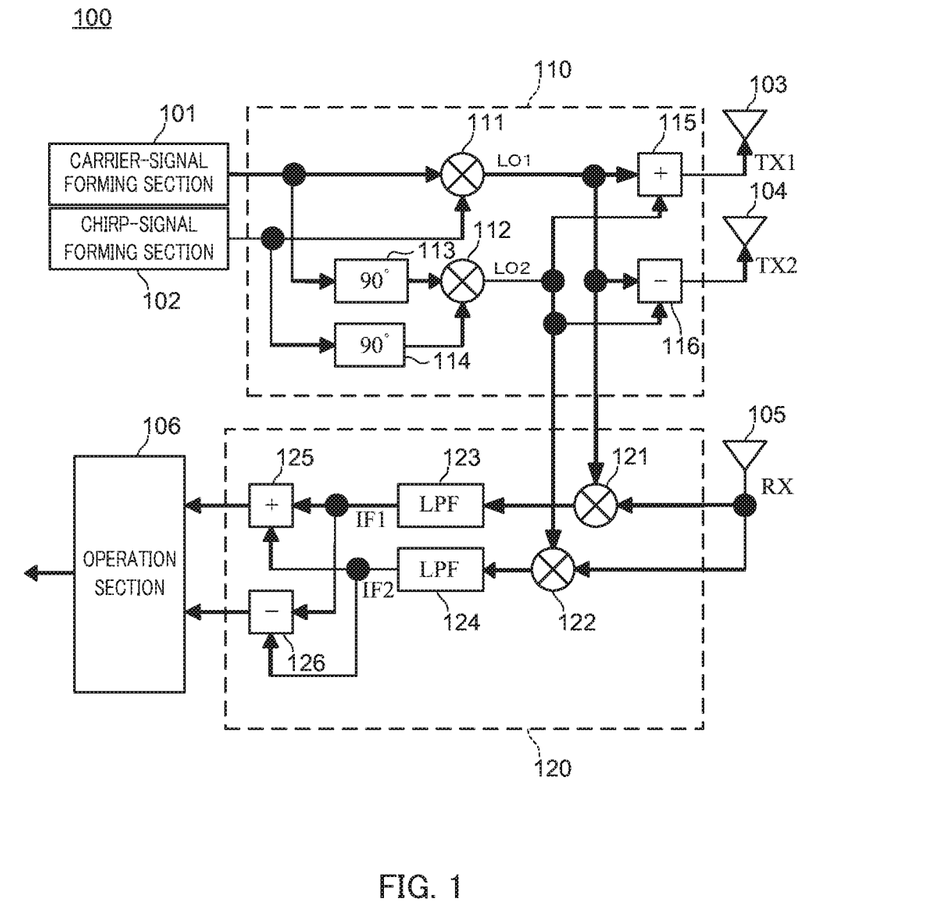

FIG. 1 is a schematic diagram illustrating an overall configuration of radar transceiver 100 according to an embodiment of the present invention.

Radar transceiver 100 includes carrier-signal forming section 101, chirp-signal forming section 102, transmission-signal forming section 110, received-signal processing section 120, transmission antennas 103 and 104, reception antenna 105, and operation section 106.

Transmission-signal forming section 110 forms an upbeat signal and a downbeat signal from a carrier signal and a chirp signal, using an image rejection circuit. Received-signal processing section 120 separates, using an image rejection circuit, a reflection signal received via reception antenna 105 into a reflection signal based on the upbeat signal and a reflection signal based on the downbeat signal.

A more specific description will be given, hereinafter. Transmission-signal forming section 110 inputs the carrier signal formed by carrier-signal forming section 101 and the chirp signal formed by chirp signal forming section 102 to first transmission mixer 111, thereby outputting first mixing signal LO1 from first transmission mixer 111. Furthermore, transmission-signal forming section 110 shifts, by 90 degrees, the phase of the carrier signal formed by carrier-signal forming section 101 and the phase of the chirp signal formed by chirp-signal forming section 102, by phase shifters 113 and 114, respectively, and then inputs the signals to second transmission mixer 112, thereby outputting second mixing signal LO2 from second transmission mixer 112.

First and second mixed signals LO1 and LO2 are added together by adder 115 into first transmission signal TX1, and this first transmission signal TX1 is transmitted via first transmission antenna 103. Moreover, adder 116 obtains second transmission signal TX2 by subtracting second mixing signal LO2 from first mixing signal LO1. This second transmission signal TX2 is transmitted via second transmission antenna 104.

Reception antenna 105 receives, as received signal RX, a signal including a mixture of a reflection signal from an object of first transmission signal TX1 and a reflection signal from an object of second transmission signal TX2.

Received signal RX is inputted to first and second reception mixers 121 and 122. First reception mixer 121 obtains a first down-conversion signal by multiplying received signal RX by first mixing signal (first local signal) LO1. Second reception mixer 122 obtains a second down-conversion signal by multiplying received signal RX by second mixing signal (second local signal) LO2.

First down-conversion signal IF1 from which a high frequency component is removed by low-pass filter (LPF) 123 is inputted to adder 125 and adder 126. Moreover, second down-conversion signal IF2 from which a high frequency component is removed by low-pass filter (LPF) 124 is inputted to adder 125 and adder 126. Adder 125 obtains a reflection signal based on a downbeat signal by adding together first down-conversion signal IF1 and second down-conversion signal IF2. Adder 126 obtains a reflection signal based on an upbeat signal by subtracting second down-conversion signal IF2 from first down-conversion signal IF1.

Operation section 106 calculates a distance and/or a velocity to a reflection object by performing a predetermined operation using outputs of adders 125 and 126.

Next, an operation of radar transceiver 100 will be described in detail.

Figure 2:
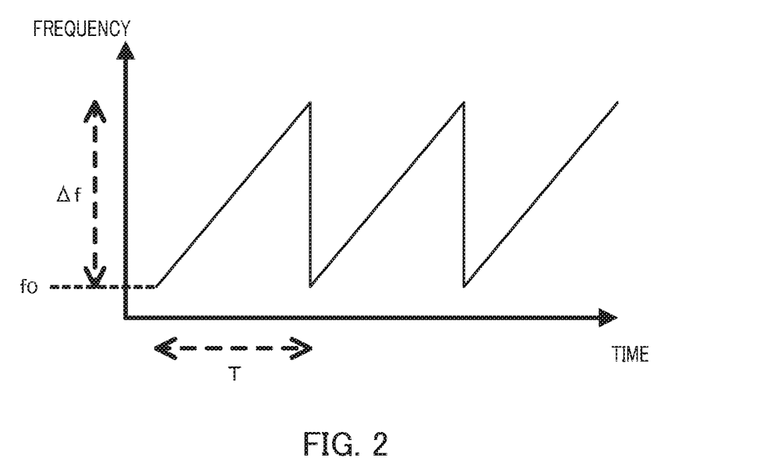

Chirp-signal forming section 102 forms a chirp signal as illustrated in FIG. 2, for example. The frequency of the chirp signal that changes at a constant rate during time t can be expressed by the following expression.

[1]

$$\frac{\Delta f}{T} t + f_0 \text{ (Hz)} \quad \text{(Expression 1)}$$

In Expression 1, "T (seconds)" represents time to change the frequency, while "Δf (Hz)" represents the frequency width to be changed, and "$f_o$ (Hz)" represents the frequency at start of the signal. This chirp signal repeats the frequency change as illustrated in the drawing.

Carrier-signal forming section 101 forms a constant-frequency carrier signal. This carrier frequency is referred to as "fc (e.g., fc=79 GHz)."

First mixing signal LO1 to be outputted from first transmission mixer 111 can be expressed by the following expression. In this expression, "$\varphi_0$" and "$\varphi_0$" represent the initial phases of the carrier signal and chirp signal, respectively.

[2]

$$LO1 = \cos(2\pi f_c t + \phi_0) \times \cos\left(2\pi\left(\frac{\Delta f}{2T} t^2 + f_0 t\right) + \varphi_0\right) = \quad \text{(Expression 2)}$$
$$\frac{1}{2}\left\{\cos\left(2\pi(f_c - f_0)t - 2\pi\left(\frac{\Delta f}{2T}\right)t^2 + \phi_0 - \varphi_0\right) + \cos\left(2\pi(f_c + f_0)t + 2\pi\left(\frac{\Delta f}{2T}\right)t^2 + \phi_0 + \varphi_0\right)\right\}$$

The signals obtained by delaying the phases of the carrier signal and the chirp signal by 90 degrees (π/2) are inputted to second transmission mixer 112. Thus, second mixing signal LO2 to be outputted from second transmission mixer 112 can be expressed by the following expression.

[3]

$$LO2 = \quad \text{(Expression 3)}$$
$$\cos\left(2\pi f_c t + \phi_0 - \frac{\pi}{2}\right) \times \cos\left(2\pi\left(\frac{\Delta f}{2T} t^2 + f_0 t\right) + \varphi_0 - \frac{\pi}{2}\right) =$$
$$\sin(2\pi f_c t + \phi_0) \times \sin\left(2\pi\left(\frac{\Delta f}{2T} t^2 + f_0 t\right) + \varphi_0\right) =$$
$$\frac{1}{2}\left\{\cos\left(2\pi(f_c - f_0)t - 2\pi\left(\frac{\Delta f}{2T}\right)t^2 + \phi_0 - \varphi_0\right) - \cos\left(2\pi(f_c + f_0)t + 2\pi\left(\frac{\Delta f}{2T}\right)t^2 + \phi_0 + \varphi_0\right)\right\}$$

First transmission signal TX1 to be expressed by the following expression is outputted from adder 115.

[4]

$$TX1 = \qquad \text{(Expression 4)}$$
$$LO1 + LO2 = \cos\left(2\pi(f_c - f_0)t - 2\pi\left(\frac{\Delta f}{2T}\right)t^2 + \phi_0 - \varphi_0\right)$$

Second transmission signal TX2 to be expressed by the following expression is outputted from adder 116.

[5]

$$TX2 = \qquad \text{(Expression 5)}$$
$$LO1 - LO2 = \cos\left(2\pi(f_c + f_0)t + 2\pi\left(\frac{\Delta f}{2T}\right)t^2 + \phi_0 + \varphi_0\right)$$

Figure 3:
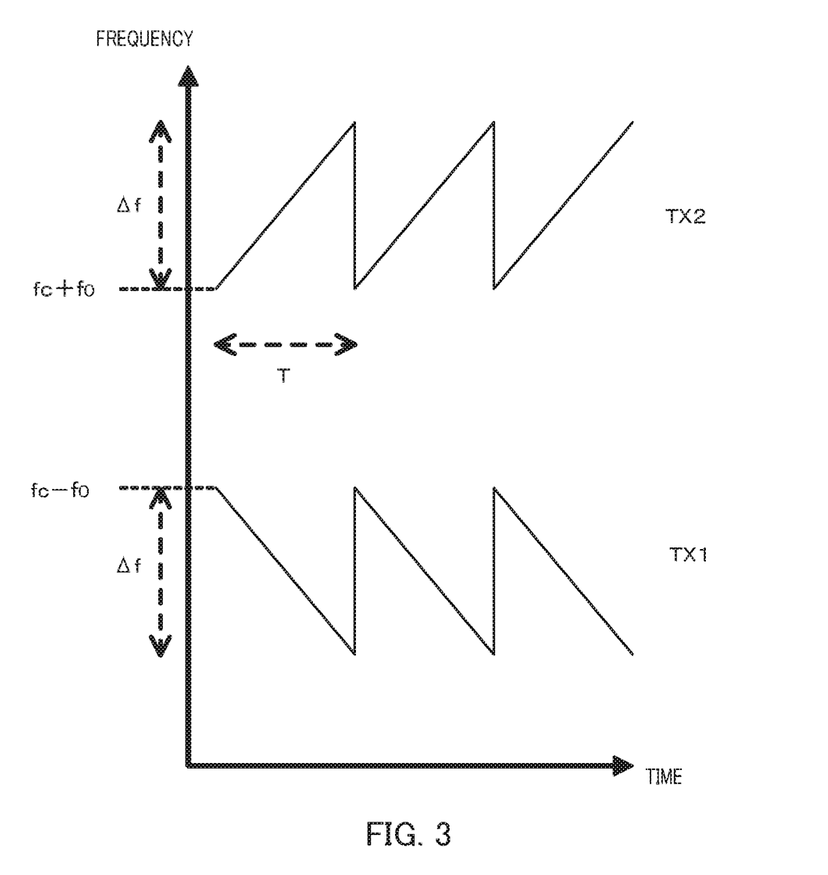

As illustrated in FIG. 3, first transmission signal TX1 is a down-chirp signal whose frequency lowers with time (may be referred to as "downbeat signal") and second transmission signal TX2 is an up-chirp signal whose frequency rises with time (may be referred to as "upbeat signal").

Figure 4:
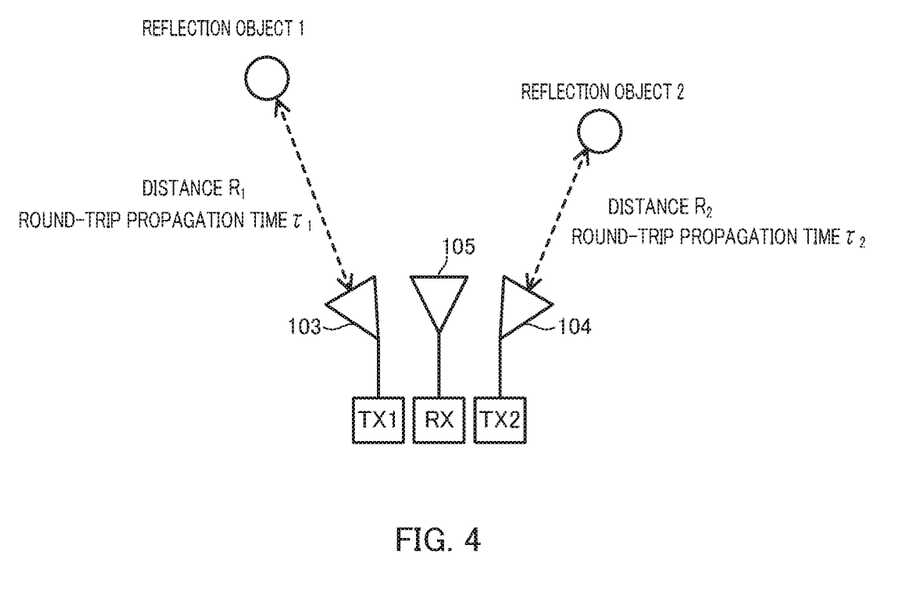
FIG. 4 is a diagram illustrating how two transmission signals are transmitted to different objects via antennas having different directivities, respectively.

As illustrated in FIG. 4, an assumption is made herein that first and second transmission signals TX1 and TX2 are transmitted via antennas 103 and 104 having different directivities, respectively.

Round-trip propagation time "$\tau_1$" representing the time during which first transmission signal TX1 is reflected from reflection object 1 located with distance $R_1$ and is returned can be expressed by the following expression.

[6]

$$\tau_1 = \frac{2R_1}{c} \qquad \text{(Expression 6)}$$

Round-trip propagation time "$\tau_2$" representing the time during which second transmission signal TX2 is reflected from reflection object 2 located with distance $R_2$ and is returned can be expressed by the following expression.

[7]

$$\tau_2 = \frac{2R_2}{c} \qquad \text{(Expression 7)}$$

Received signal RX obtained by receiving, via reception antenna 105, the two signals which have been reflected from objects 1 and 2, respectively, can be expressed by the following expression. In this expression, "A1" and "A2" represent amplitudes of the received signals for first and second transmission signals TX1 and TX2, respectively.

[8]

$$RX = \qquad \text{(Expression 8)}$$
$$\left\{A_1 \times \cos\left(2\pi(f_c - f_0)(t - \tau_1) - 2\pi\left(\frac{\Delta f}{2T}\right)(t - \tau_1)^2 + \phi_0 - \varphi_0\right) + A_2 \times \cos\left(2\pi(f_c + f_0)(t - \tau_2) + 2\pi\left(\frac{\Delta f}{2T}\right)(t - \tau_2)^2 + \phi_0 + \varphi_0\right)\right\}$$

First reception mixer 121 obtains first down-conversion signal IF1 by down converting received signal RX by first mixing signal (first local signal) LO1. This first down-conversion signal IF1 can be expressed by the following expression.

[9]

$$\text{(Expression 9)}$$
$$IF1 = RX \times LO1 =$$
$$\left\{A_1 \times \cos\left(2\pi(f_c - f_0)(t - \tau_1) - 2\pi\left(\frac{\Delta f}{2T}\right)(t - \tau_1)^2 + \phi_0 - \varphi_0\right) + A_2 \times \cos\left(2\pi(f_c + f_0)(t - \tau_2) + 2\pi\left(\frac{\Delta f}{2T}\right)(t - \tau_2)^2 + \phi_0 + \varphi_0\right)\right\} \times$$
$$\frac{1}{2}\left\{\cos\left(2\pi(f_c - f_0)t - 2\pi\left(\frac{\Delta f}{2T}\right)t^2 + \phi_0 - \varphi_0\right) + \cos\left(2\pi(f_c + f_0)t + 2\pi\left(\frac{\Delta f}{2T}\right)t^2 + \phi_0 + \varphi_0\right)\right\} =$$
$$\left\{\frac{A_1}{2}\cos\left(2\pi(f_c - f_0)(t - \tau_1) - 2\pi\left(\frac{\Delta f}{2T}\right)(t - \tau_1)^2 + \phi_0 - \varphi_0\right)\right.$$
$$\cos\left(2\pi(f_c - f_0)t - 2\pi\left(\frac{\Delta f}{2T}\right)t^2 + \phi_0 - \varphi_0\right) +$$
$$\frac{A_2}{2}\cos\left(2\pi(f_c + f_0)(t - \tau_2) + 2\pi\left(\frac{\Delta f}{2T}\right)(t - \tau_2)^2 + \phi_0 + \varphi_0\right)$$
$$\cos\left(2\pi(f_c - f_0)t - 2\pi\left(\frac{\Delta f}{2T}\right)t^2 + \phi_0 + \varphi_0\right) +$$
$$\frac{A_1}{2}\cos\left(2\pi(f_c - f_0)(t - \tau_1) - 2\pi\left(\frac{\Delta f}{2T}\right)(t - \tau_1)^2 + \phi_0 - \varphi_0\right)$$
$$\cos\left(2\pi(f_c + f_0)t + 2\pi\left(\frac{\Delta f}{2T}\right)t^2 + \phi_0 + \varphi_0\right) +$$
$$\frac{A_2}{2}\cos\left(2\pi(f_c + f_0)(t - \tau_1) + 2\pi\left(\frac{\Delta f}{2T}\right)(t - \tau_1)^2 + \phi_0 + \varphi_0\right)$$
$$\left.\cos\left(2\pi(f_c + f_0)t + 2\pi\left(\frac{\Delta f}{2T}\right)t^2 + \phi_0 + \varphi_0\right)\right\} \approx$$
$$\left\{\frac{A_1}{4}\cos\left(-2\pi(f_c - f_0)\tau_1 + 2\pi\left(\frac{\Delta f}{T}\right)\tau_1 t - 2\pi\left(\frac{\Delta f}{2T}\right)\tau_1^2\right) +\right.$$
$$\frac{A_2}{4}\cos\left(-2\pi(f_c + f_0)\tau_2 + 2\pi(2f_0)t + 2\pi\left(\frac{\Delta f}{T}\right)t^2 - 2\pi\left(\frac{\Delta f}{T}\right)\tau_2 t + 2\pi\left(\frac{\Delta f}{2T}\right)\tau_2^2 + 2\varphi_0\right) +$$
$$\frac{A_1}{4}\cos\left(-2\pi(f_c - f_0)\tau_1 - 2\pi(2f_0)t - 2\pi\left(\frac{\Delta f}{T}\right)t^2 +\right.$$
$$2\pi\left(\frac{\Delta f}{T}\right)\tau_1 t - 2\pi\left(\frac{\Delta f}{2T}\right)\tau_1^2 - 2\varphi_0\right) +$$
$$\left.\frac{A_2}{4}\cos\left(-2\pi(f_c + f_0)\tau_2 - 2\pi\left(\frac{\Delta f}{T}\right)\tau_2 t + 2\pi\left(\frac{\Delta f}{2T}\right)\tau_2^2\right)\right\}$$

Second reception mixer 122 obtains second down-conversion signal IF2 by down converting received signal RX by second mixing signal (second local signal) LO2. This second down-conversion signal IF2 can be expressed by the following expression.

[10]

$$\text{(Expression 10)}$$
$$IF2 = RX \times LO2 =$$
$$\left\{A_1 \times \cos\left(2\pi(f_c - f_0)(t - \tau_1) - 2\pi\left(\frac{\Delta f}{2T}\right)(t - \tau_1)^2 + \phi_0 - \varphi_0\right)A_2 \times\right.$$

$$\cos\left(2\pi(f_c + f_0)(t - \tau_2) + 2\pi\left(\frac{\Delta f}{2T}\right)(t - \tau_2)^2 + \phi_0 + \varphi_0\right)\right\} \times$$

$$\frac{1}{2}\left\{\cos\left(2\pi(f_c - f_0)t - 2\pi\left(\frac{\Delta f}{2T}\right)t^2 + \phi_0 - \varphi_0\right) -$$

$$\cos\left(2\pi(f_c + f_0)t + 2\pi\left(\frac{\Delta f}{2T}\right)t^2 + \phi_0 + \varphi_0\right)\right\} \approx$$

$$\left\{\frac{A_1}{4}\cos\left(-2\pi(f_c - f_0)\tau_1 + 2\pi\left(\frac{\Delta f}{T}\right)\tau_1 t - 2\pi\left(\frac{\Delta f}{2T}\right)\tau_1^2\right) +$$

$$\frac{A_2}{4}\cos\left(-2\pi(f_c + f_0)\tau_2 + 2\pi(2f_0)t + 2\pi\left(\frac{\Delta f}{T}\right)t^2 -$$

$$2\pi\left(\frac{\Delta f}{T}\right)\tau_2 t + 2\pi\left(\frac{\Delta f}{2T}\right)\tau_2^2 + 2\varphi_0\right) - \frac{A_1}{4}\cos\left(-2\pi(f_c - f_0)\tau_1 - 2\pi(2f_0)t -$$

$$2\pi\left(\frac{\Delta f}{T}\right)t^2 + 2\pi\left(\frac{\Delta f}{T}\right)\tau_1 t - 2\pi\left(\frac{\Delta f}{2T}\right)\tau_1^2 - 2\varphi_0\right) -$$

$$\frac{A_2}{4}\cos\left(-2\pi(f_c + f_0)\tau_2 - 2\pi\left(\frac{\Delta f}{T}\right)\tau_2 t + 2\pi\left(\frac{\Delta f}{2T}\right)\tau_2^2\right)\right\}$$

First and second down-conversion signals IF1 and IF2 from which high frequency components have been removed by low-pass filters 123 and 124 can be expressed by the following expressions, respectively.

[11]

$$IF1 = \frac{A_1}{4}\cos\left(-2\pi\left((f_c - f_0)\tau_1 + \left(\frac{\Delta f}{2T}\right)\tau_1^2\right) + 2\pi\left(\frac{\Delta f}{T}\right)\tau_1 t\right) + \quad \text{(Expression 11)}$$

$$\frac{A_2}{4}\cos\left(-2\pi\left((f_c + f_0)\tau_2 - \left(\frac{\Delta f}{2T}\right)\tau_2^2\right) - 2\pi\left(\frac{\Delta f}{T}\right)\tau_2 t\right)$$

[12]

$$IF2 = \frac{A_1}{4}\cos\left(-2\pi\left((f_c - f_0)\tau_1 + \left(\frac{\Delta f}{2T}\right)\tau_1^2\right) + 2\pi\left(\frac{\Delta f}{T}\right)\tau_1 t\right) - \quad \text{(Expression 12)}$$

$$\frac{A_2}{4}\cos\left(-2\pi\left((f_c + f_0)\tau_2 - \left(\frac{\Delta f}{2T}\right)\tau_2^2\right) - 2\pi\left(\frac{\Delta f}{T}\right)\tau_2 t\right)$$

Down-conversion signal IF1 and expressed by Expression 11 and down-conversion signal IF2 expressed by Expression 12 contain first transmission signal TX1 and second transmission signal TX2, but only a reflection signal of first transmission signal TX1 or only a reflection signal of second transmission signal TX2 may be taken out by performing addition and subtraction with adders 125 and 126, respectively.

From adder 125, a signal containing only a reflection signal of first transmission signal TX1 is outputted as expressed by the following expression.

[13]

$$IF1 + IF2 = \quad \text{(Expression 13)}$$

$$\frac{A_1}{2}\cos\left(-2\pi\left((f_c - f_0)\tau_1 + \left(\frac{\Delta f}{2T}\right)\tau_1^2\right) + 2\pi\left(\frac{\Delta f}{T}\right)\tau_1 t\right)$$

Furthermore, from adder 126, a signal containing only a reflection signal of second transmission signal TX2 is outputted as expressed by the following expression.

[14]

$$IF1 - IF2 = \quad \text{(Expression 14)}$$

$$\frac{A_2}{2}\cos\left(-2\pi\left((f_c + f_0)\tau_2 - \left(\frac{\Delta f}{2T}\right)\tau_2^2\right) - 2\pi\left(\frac{\Delta f}{T}\right)\tau_2 t\right)$$

Figure 5:
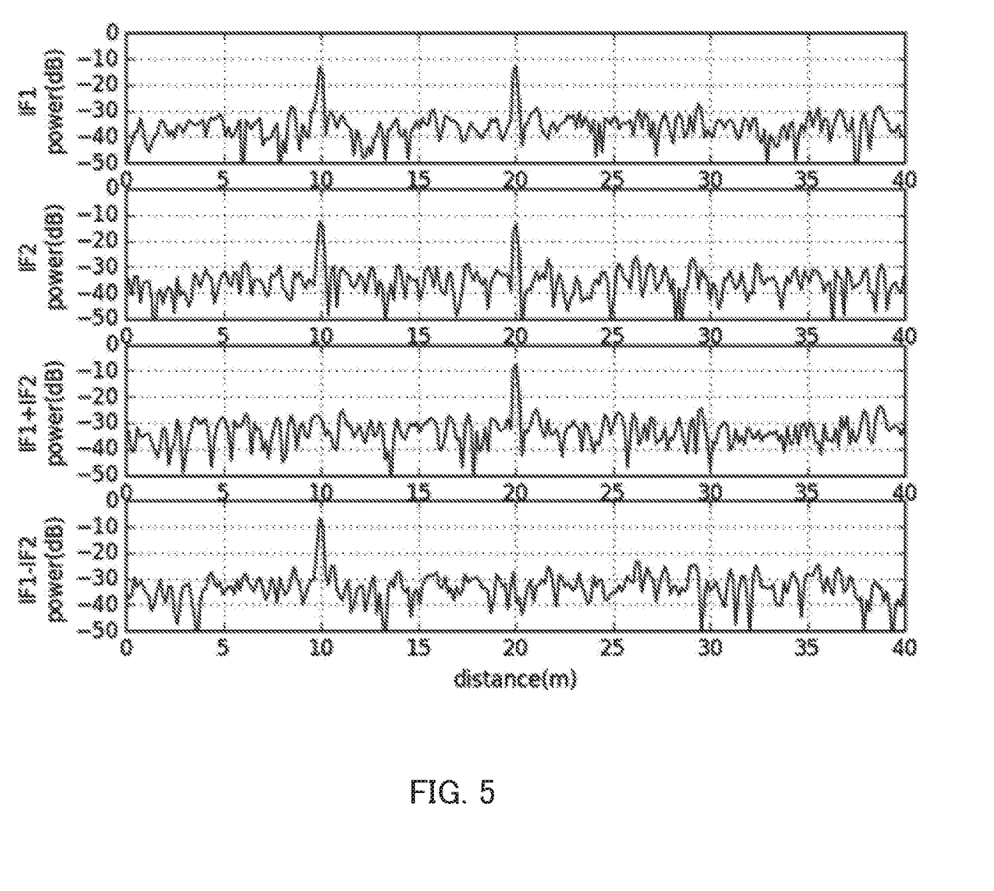
FIG. 5 is a diagram illustrating aspects of IF1, IF2, IF1+IF2, and IF1−IF2 obtainable by the radar transceiver according to the embodiment.

FIG. 5 illustrates the aspects of IF1, IF2, IF1+IF2, and IF1−IF2 obtainable by radar transceiver 100 according to this embodiment in a case where $R_1$=20 m and $R_2$=10 m.

As described above, in radar transceiver 100 according to this embodiment, an up-chirp signal (upbeat signal) and a down-chirp signal (downbeat signal) can be simultaneously transmitted via different transmission antennas 104 and 103, respectively, and the respective reflection signals can be received via single reception antenna 105 and then separated from each other.

Next, operation section 106 computes a distance to a reflection object and/or a velocity of the reflection object by using the signals obtained by adders 125 and 126. For this computing processing for the distance and velocity by operation section 106, a variety of known computing processing, such as one described in PTL 1 can be applied. Hereinafter, an example of this computing processing will be briefly described.

Operation section 106 calculates frequencies $f_1$ and $f_2$ as expressed by Expressions 15 and 16, by applying FFT processing on each of a sum signal and a difference signal obtained by adders 125 and 126, respectively, and furthermore, estimates distances $R_1$ and $R_2$ to a reflection object by operations expressed by Expressions 15 and 16.

[15]

$$f_1 = \frac{\Delta f}{T}\tau_1 = \frac{\Delta f}{T} \times \frac{2R_1}{c} \rightarrow R_1 = \frac{cT}{2\Delta f}f_1 \quad \text{(Expression 15)}$$

[16]

$$f_2 = \frac{\Delta f}{T}\tau_2 = \frac{\Delta f}{T} \times \frac{2R_2}{c} \rightarrow R_2 = \frac{cT}{2\Delta f}f_2 \quad \text{(Expression 16)}$$

Hereinafter, a case is considered where first and second transmission signals TX1 and TX2 are directed to the reflection object under the assumption that the velocity of the reflection object is expressed by velocity "$v_0$."

Distance R is a function of time and thus can be expressed by the following expression.

$$R = R_0 + v_0 t \quad \text{(Expression 17)}$$

In this case, the delay time can be expressed by the following expression.

[18]

$$\tau = \frac{2(R_0 + v_0 t)}{c} \quad \text{(Expression 18)}$$

Accordingly, the signal expressed by Expression 19 is outputted from adder 125 and the signal expressed by Expression 20 is outputted from adder 126.

[19]

$$IF1 + IF2 \approx \frac{A_1}{2}\cos\left(-2\pi\left((f_c - f_0)\frac{2(R_0 + v_0 t)}{c}\right) + \right.$$
$$\left. 2\pi\left(\frac{\Delta f}{T}\frac{2(R_0 + v_0 t)}{c}\right)t\right) =$$
$$\frac{A_1}{2}\cos\left(-2\pi\left(\frac{2(f_c - f_0)R_0}{c}\right) - \right.$$
$$\left. 2\pi\left((f_c - f_0)\frac{2v_0}{c} - \frac{2\Delta f R_0}{cT}\right)t + 2\pi\left(\frac{2\Delta f v_0}{cT}\right)t^2\right)$$

(Expression 19)

[20]

$$IF1 - IF2 \approx \frac{A_2}{2}\cos\left(-2\pi\left((f_c + f_0)\frac{2(R_0 + v_0 t)}{c}\right) - \right.$$
$$\left. 2\pi\left(\frac{\Delta f}{T}\frac{2(R_0 + v_0 t)}{c}\right)t\right) =$$
$$\frac{A_2}{c}\cos\left(-2\pi\left(\frac{2(f_c + f_0)R_0}{c}\right) - \right.$$
$$\left. 2\pi\left((f_c + f_0)\frac{2v_0}{c} + \frac{2\Delta f R_0}{cT}\right)t - 2\pi\left(\frac{2\Delta f v_0}{cT}\right)t^2\right)$$

(Expression 20)

Suppose that the frequencies of the transmission signals are $f_c \gg f_0$, they are expressed by Expression 21, and distance "$R_0$" and velocity "$v_0$" can be estimated by Expression 22 with these two frequencies.

[21]

$$f_1 \approx \frac{2\Delta f R_0}{cT} - \frac{2f_c v_0}{c}$$
$$f_2 \approx \frac{2\Delta f R_0}{cT} + \frac{2f_c v_0}{c}$$

(Expression 21)

[22]

$$R_0 = \frac{cT}{4\Delta f}(f_1 + f_2)$$
$$v_0 = \frac{c}{4f_c}(f_2 - f_1)$$

(Expression 22)

As described above, according to the present embodiment, providing transmission-signal forming section 110 and received-signal processing section 120 makes it possible to realize a radar transceiver capable of forming, using a simple configuration, an upbeat signal and a downbeat signal to be simultaneously transmitted. Transmission-signal forming section 110 forms an upbeat signal and a downbeat signal from a carrier signal and a chirp signal, using an image rejection circuit. Received-signal processing section 120 separates, using an image rejection circuit, a reflection signal received via reception antenna 105 into a reflection signal based on the upbeat signal and a reflection signal based on the downbeat signal.

Incidentally, in a case where a band-pass filter is used as in PTL 2, it is difficult to take out only a one-side image signal in 79 GHz band (77 to 81 GHz). With a band-pass filter, it is difficult to take out a close band. Meanwhile, in the present embodiment, an upbeat signal and a downbeat signal are formed using an image rejection circuit, and thus, the upbeat signal and downbeat signal can be formed in bands close to each other. Thus, it is made possible to easily form an upbeat signal and a downbeat signal that fall into 79 GHz band (77 to 81 GHz).

The embodiment described above illustrates only a specific example for implementing the present invention, and the technical scope of the present invention should not be restrictively interpreted because of this embodiment. More specifically, the present invention can be implemented in various ways within a range not departing from the gist of or the primary characteristics of the present invention.

In the embodiment described above, a description has been given of the case where an upbeat signal and a downbeat signal are transmitted via antennas having different directivities, respectively. The upbeat signal and downbeat signal, however, may be transmitted via two antennas of different polarized waves (H and V). Moreover, the upbeat signal and downbeat signal may be transmitted via the same antenna. Furthermore, a transmission antenna and a reception antenna may be formed using a plurality of array antennas.

Moreover, in the embodiment described above, a description has been given of the case where the first and the second transmission signals are transmitted in the form of radio waves while radio waves reflected from a target object are received, i.e., a case where the present invention is applied to a radar transceiver of a so-called radio wave system, but the present invention can be applied to a radar transceiver of a so-called laser radar system.

Figure 6:
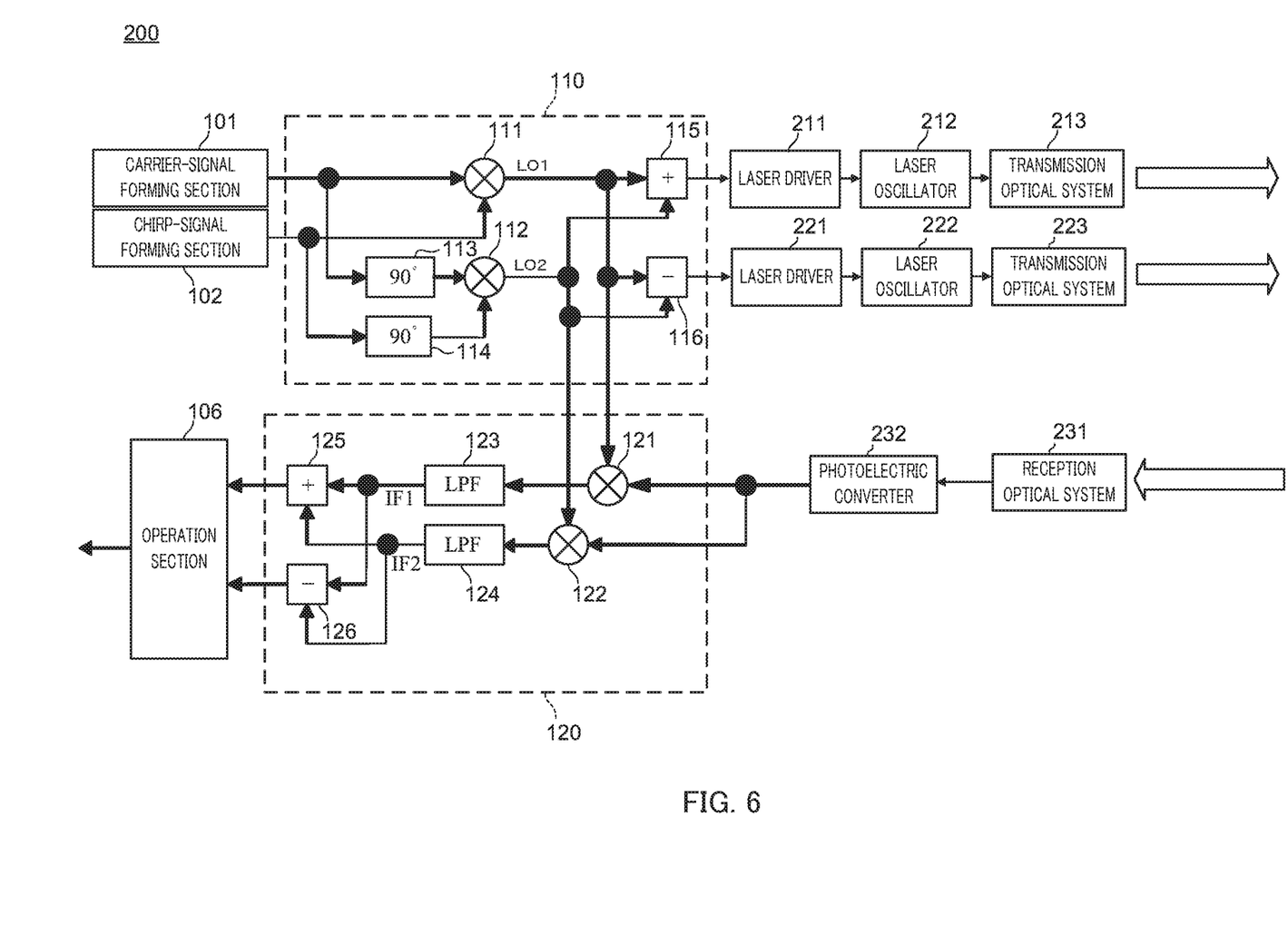
FIG. 6 is a schematic diagram illustrating a configuration of a radar transceiver according to another embodiment.

FIG. 6 is a diagram illustrating a configuration example of a case where the present invention is applied to a radar transceiver of the laser radar system. In FIG. 6, in which parts corresponding to the parts in FIG. 1 are denoted by the same reference numerals, radar transceiver 200 inputs a downbeat signal outputted from adder 115 to laser driver 211. Laser driver 211 controls laser oscillator 212 based on the downbeat signal, thereby outputting, from laser oscillator 212, a laser beam corresponding to the downbeat signal. The laser beam outputted from laser oscillator 212 is directed to a target object by transmission optical system 213.

Likewise, radar transceiver 200 inputs an upbeat signal outputted from adder 116 to laser driver 221. Laser driver 221 controls laser oscillator 222 based on the upbeat signal, thereby outputting, from laser oscillator 222, a laser beam corresponding to the upbeat signal. The laser beam outputted from laser oscillator 222 is directed to a target object by transmission optical system 223.

The laser beams reflected from the target object are inputted to photoelectric converter 232 via reception optical system 231. Photoelectric converter 232 obtains an electric signal by receiving the reflection light and applying photoelectric conversion to the light and outputs the obtained electric signal to reception mixers 121 and 122.

As described above, radar transceiver 200 in FIG. 6 includes: first laser beam outputting section (laser driver 211 and/or laser oscillator 212) that outputs a first laser beam corresponding to a downbeat signal; a second laser beam outputting section (laser driver 221 and/or laser oscillator 222) that outputs a second laser beam corresponding to an upbeat signal; and a light-receiving section (photoelectric converter 232) that receives reflection light resulting from the first and the second laser beams that have been outputted from the first and the second laser outputting sections and reflected from the target object. Employing the configuration as described herein makes it possible to apply the present invention to a radar transceiver of the laser radar system.

INDUSTRIAL APPLICABILITY

The present invention is suitable for a radar transceiver to be mounted on, for example, a vehicle and to detect a surrounding object.

REFERENCE SIGNS LIST 100, 200 Radar transceiver
103, 104 Transmission antenna
105 Reception antenna
110 Transmission-signal forming section
111, 112, 121, 122 Mixer
113, 114, 90-degree phase shifter
120 Received-signal processing section
211, 221 Laser driver
212, 222 Laser oscillator
213, 223 Transmission optical system

The invention claimed is:

1. A radar transceiver that transmits an upbeat signal and a downbeat signal, simultaneously, and receives the upbeat signal and the downbeat signal to detect a target object, the radar transceiver comprising:
a transmission-signal forming section that forms the upbeat signal and the downbeat signal from a carrier signal and a chirp signal, using an image rejection circuit;
a transmission section that simultaneously transmits the upbeat signal and the downbeat signal formed by the transmission-signal forming section;
a reception section that receives a reflection signal generated when the transmitted upbeat and downbeat signals are reflected from the target object; and
a received-signal processing section that separates, using an image rejection circuit, the reflection signal received by the reception section into a reflection signal based on the upbeat signal and a reflection signal based on the downbeat signal.

2. The radar transceiver according to claim 1, wherein:
the transmission-signal forming section comprises:
a first mixer that multiplies the carrier signal by the chirp signal;
a second mixer that multiplies the carrier signal by the chirp signal, the carrier signal and the chirp signal being signals respectively having phases shifted by 90 degrees with respect to the carrier signal and the chirp signal to be inputted to the first mixer;
a first adder that outputs the downbeat signal by adding together output of the first mixer and output of the second mixer; and
a second adder that outputs the upbeat signal by performing subtraction processing between the output of the first mixer and the output of the second mixer.

3. The radar transceiver according to claim 2, wherein:
the received-signal processing section comprises:
a third mixer that multiplies the reflection signal by an output signal of the first mixer;
a fourth mixer that multiplies the reflection signal by an output signal of the second mixer;
a third adder that obtains the reflection signal based on the downbeat signal by adding together output of the third mixer and output of the fourth mixer; and
a fourth adder that obtains the reflection signal based on the upbeat signal by performing subtraction processing between the output of the third mixer and the output of the fourth mixer.

4. The radar transceiver according to claim 1, wherein:
the transmission section comprises a first antenna and a second antenna, the first antenna transmitting the downbeat signal, the second antenna transmitting the upbeat signal, and
the reception section comprises a reception antenna that receives a reflection signal generated when the downbeat signal and the upbeat signal transmitted via the first and the second antennas, respectively, are reflected by the target object.

5. The radar transceiver according to claim 1, wherein:
the transmission section comprises a first laser beam outputting section and a second laser beam outputting section, the first laser beam outputting section outputting a first laser beam corresponding to the downbeat signal, the second laser beam outputting section outputting a second laser beam corresponding to the upbeat signal, and
the reception section comprises a light reception section that receives reflection light resulting from reflection of the first and the second laser beams from the target object, the light reception section applying photoelectric conversion to the reflection light, the first and the second laser beams being outputted from the first and the second laser beam outputting sections, respectively.

* * * * *